F. CRAWFORD.
CONDUIT THREADING DEVICE.
APPLICATION FILED APR. 15, 1909.
966,799.
Patented Aug. 9, 1910.
2 SHEETS—SHEET 1.
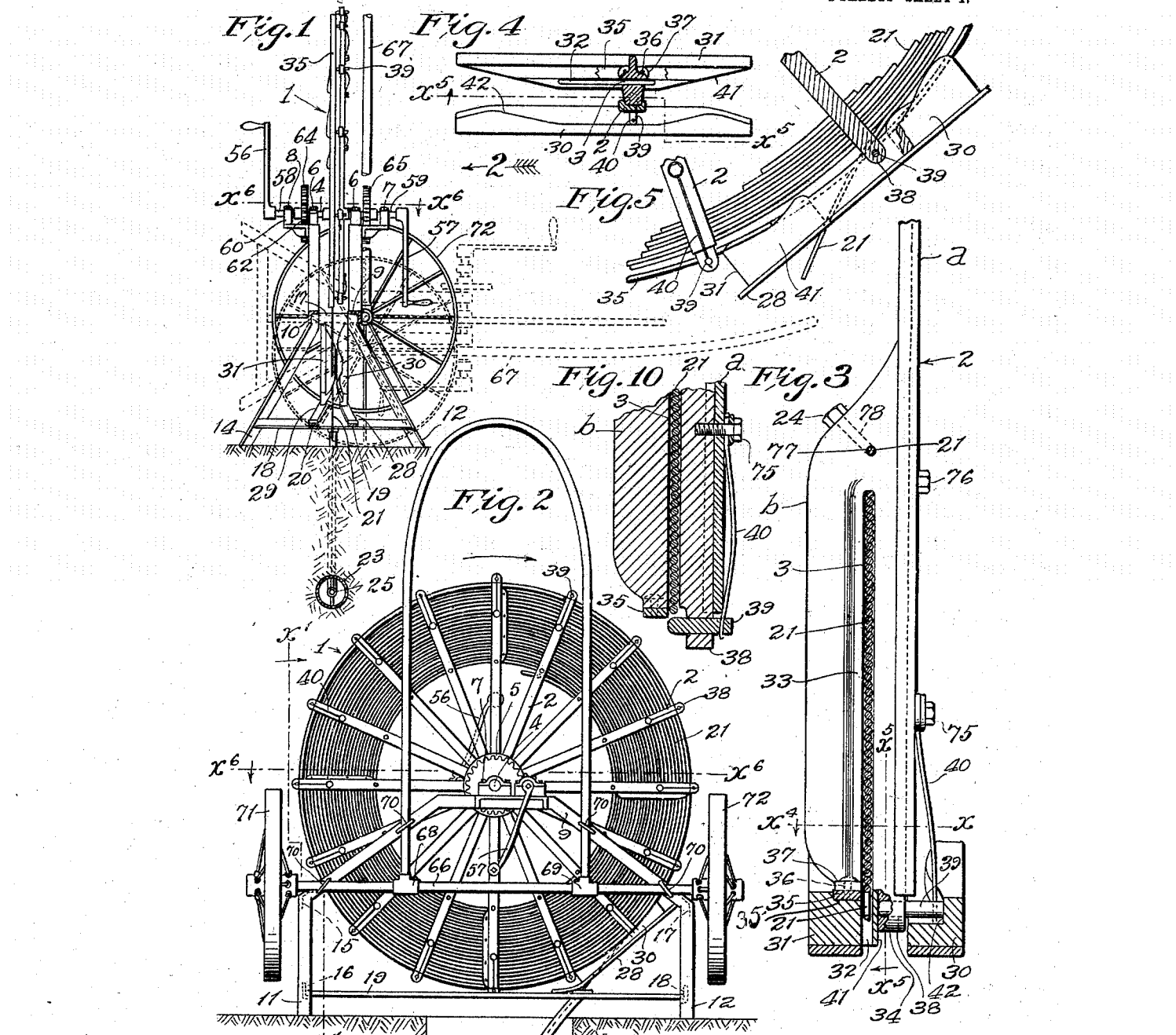
Witnesses
C. C. Holly
M. Beulah Townsend
Inventor
Frank Crawford
by James R. Townsend
his atty.

F. CRAWFORD.
CONDUIT THREADING DEVICE.
APPLICATION FILED APR. 15, 1909.
966,799.
Patented Aug. 9, 1910.
2 SHEETS—SHEET 2.
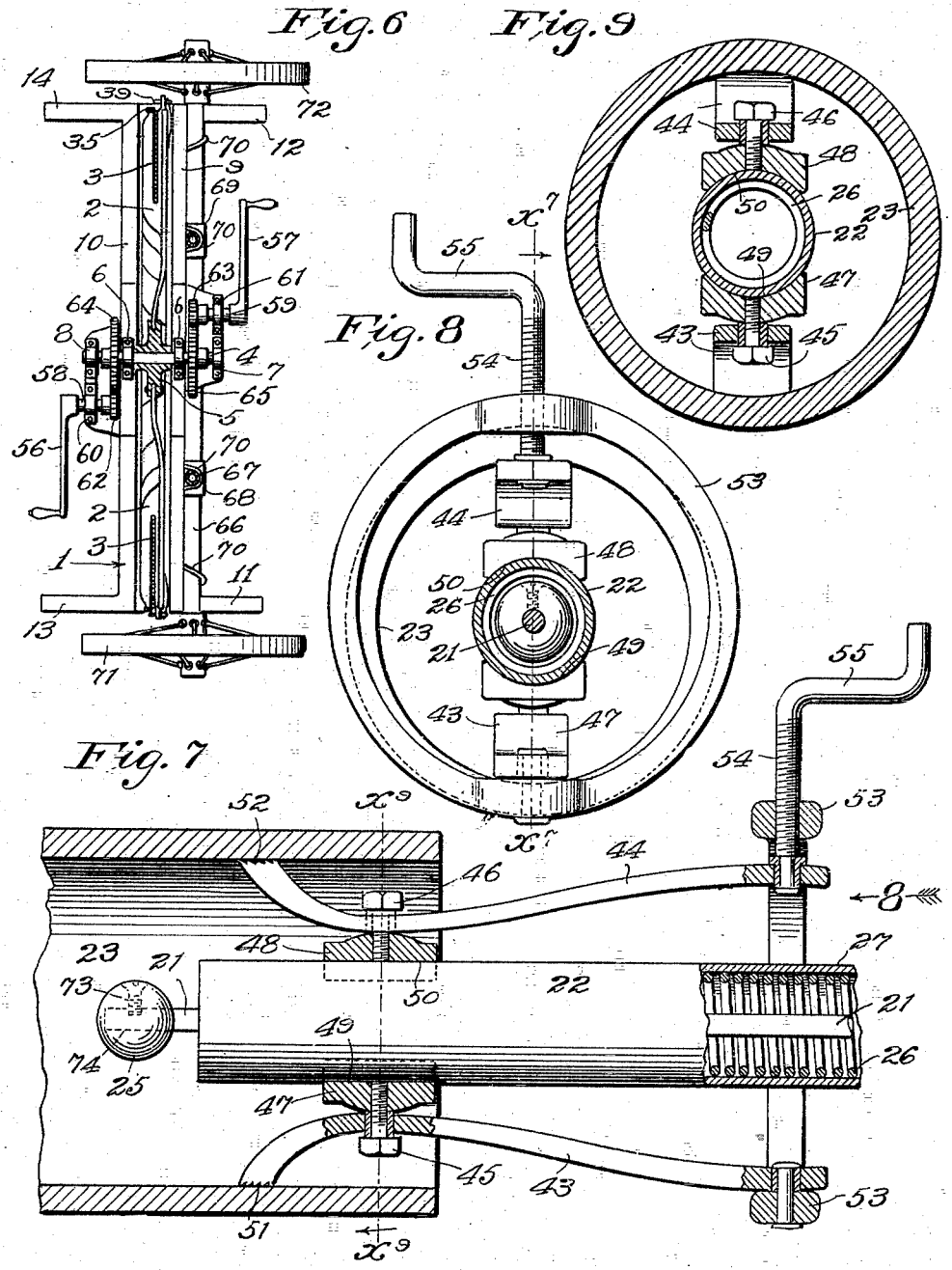
Witnesses
C. C. Holly
Julia Townsend
Inventor
Frank Crawford
by James R. Townsend
his attys.

UNITED STATES PATENT OFFICE.

FRANK CRAWFORD, OF PASADENA, CALIFORNIA, ASSIGNOR, BY DIRECT AND MESNE ASSIGNMENTS, TO CONDUIT THREADING DEVICE COMPANY, OF PASADENA, CALIFORNIA, A CORPORATION OF CALIFORNIA.

CONDUIT-THREADING DEVICE.

966,799.

Specification of Letters Patent.   Patented Aug. 9, 1910.

Application filed April 15, 1909.   Serial No. 490,196.

*To all whom it may concern:*

Be it known that I, FRANK CRAWFORD, a citizen of the United States, residing at Pasadena, in the county of Los Angeles and State of California, have invented a new and useful Conduit-Threading Device, of which the following is a specification.

The object of this invention is to provide means to facilitate the passing of wires through underground conduits in streets and elsewhere where telephone and other electric wires are to be placed.

The invention is designed for use in any situation where electric cables or wires or other devices are required to be passed through pipes or conduits of any kind.

In this invention the means depended upon for drawing the cable or other device through the underground conduit or other pipe, is a wire that may be coiled but yet is of sufficient stiffness to be forced through a section of underground conduit or other pipe through which the cable or other device is to be drawn; the stiffness of the wire being such as to prevent the wire from kinking inside the conduit under any endwise pressure that may be necessary to force it through the conduit.

Further objects of the invention are convenience of transportation, ease and speed of setting up the apparatus at the man-hole through which the cables are to be drawn, and speed in forcing the threading wire through the conduit in one direction to receive the end of the cable or other device to be drawn through the conduit, and speed in drawing the cable or other device through the conduit. Also to so construct the machine that as soon as the cable has been drawn through the conduit the machine is ready for another operation or for immediate removal to another man-hole without the loss of time.

The invention may be carried out in various ways, and I shall illustrate the same in the best form in which I at present contemplate embodying the invention.

The accompanying drawings illustrate the invention.

Figure 1 is a fragmental elevation of the apparatus in position for inserting a wire through a subterranean conduit which is shown in section. Dotted lines indicate the position of parts when the apparatus is ready to be trundled away. The view is taken from line $x^1$, Fig. 2, looking toward the right. Fig. 2 is an elevation from the arrow 2 at the right of Fig. 1. Fig. 3 is an elevation of one of the slotted spokes forming a radial way for the coils of wire that are to be threaded through the conduit. Fig. 4 is a fragmental plan in section on line $x^4$, Fig. 3. Fig. 5 is a section on line $x^5$, Figs. 3 and 4, another spoke being also shown. Fig. 6 is a plan section on line $x^6$, Figs. 1 and 2. Fig. 7 is a sectional detail of the guide-clamp shown at the bottom of Fig. 2. $x^7$, Fig. 8 indicates the line of section. Fig. 8 is a detail of the guide-clamp viewed from the arrow 8 in Fig. 7, the screw-crank being turned. Fig. 9 is a section on line $x^9$, Fig. 7. Arrows on the section-lines indicate the direction of sight in the different views. Fig. 10, Sheet 1, is a sectional view of the outer end of the slotted spoke after it has passed the shoe and the wire-holding pin has returned to wire-retaining position.

1 designates a reel having slotted spokes 2, the slots 3 of which extend in a common plane at right angles to the axis 4 of the reel, which axis extends through a hub 5 and is journaled in bearings 6, 7, 8, that are mounted on a frame composed of two bents 9 and 10, each of which is made of angle iron and terminates in two legs shown at 11, 12, and 13, 14. The two bents are fastened together by stays 15, 16, 17 and 18. The bottom stays 16 and 18 are connected by stays 19 and 20 which are spaced apart to allow the threading-wire 21 and the tubular wire-feeding guide 22 to pass from the reel to the mouth of the conduit 23. The threading-wire is coiled on the reel inside the slots 3, and is fastened at one end by a clamp screw 24 to one of the spokes. The free end of the wire is provided with a knob 25 in order that the same will pass freely through the conduit 23.

The feeding guide 22 is to prevent the wire from buckling between the conduit and the reel, and may be of any suitable material, as a wire coil 26 with or without a sheath 27 of rubber, leather, or other material. A flexible metal hose will well serve the purpose. The upper end of said guide is fastened to supports 28, 29, that rigidly hold stationary shoes 30 and 31 which stand aslant at one side of the reel shown in Fig. 2.

The shoe 31 forms the unreeling guide and is provided with a slanting perforation 32 through which the wire passes from the reel downward into the feeding guide 22. Each of the slotted spokes 2 is provided on one side with a limb 33 that forms one wall of the slot, the other wall of the slot being formed by a portion 34 that projects beyond the main body of the spoke. The limbs 33 of the several spokes are connected by a tire 35 which is fastened to the limbs 33 by rivets 36 passed through lugs 37 at the ends of the limbs 33. Said tire runs in a way 35' that extends across the upper end of the portion 34. The portion 34 of the spoke projects outwardly beyond the tire 35 and is provided with a transverse hole 38, through which a wire-retainer in the form of a pin 39 extends; the same being normally held by a spring 40 across the mouth of the slot 3, to hold the wire from uncoiling. When the pins are free to respond to their springs their inner ends are outside the tire 35 ready to be engaged successively by a cam-face 41 on the shoe 31. Said cam-face 41 receives the inner ends of the pins 39 successively as the reel rotates, and each pin will slide outward as it moves along the shoe until the perforation 32 of the shoe 31 is passed.

The shoe 30 has a cam-face 42 complementary to the cam-face 41 arranged in the path of the outer end of the pin 39 so that as the pin moves around with its spoke it passes between the cam-face and at first slides outward on the cam-face 41 until the pin passes the perforation 32, whereupon the pin slides along the cam-face 42, and is thus forced back across the slot. Thus the pin is positively operated out and in to open and close the mouth of the slot 3, thus to allow the pin to pass by the out-going wire as the wheel rotates, and to immediately intercept the succeeding coil.

It is necessary that the guide 22 be securely held from buckling between the conduit and the shoe, and for this purpose means are provided for clamping the guide in the end of the conduit. This is done by means of two levers 43, 44, pivoted by bolts 45, 46, to two jaws 47, 48, having concave faces 49, 50, that fit upon the guide, the free ends of the levers being provided with roughened faces 51, 52, to engage the inside walls of the conduit 23 into which they may be inserted after the blocks have been engaged with the guide 22.

The long ends of the levers 43, 44, are connected to the clamp-frame 53, inside which they are pivotally mounted, one of said jaws being carried by a screw 54 having a handle 55 by which it may be turned, thus to force the long ends of the levers toward each other and the engaging faces 51, 52, outward to forcibly grip the conduit 23 by means of the faces 51 and 52, and also to grip the guide 22 by means of the blocks 47, 48.

The reel is operable by any suitable means for applying power thereto. Such means may be the cranks 56, 57, the shaft 58, 59 of which are mounted in bearings 60 and 61. On said shafts are mounted pinions 62, 63, which drive the spur-gears 64 and 65 that are fixed to the shaft 4 of the reel.

The frame mounted by the pins is connected with an axle 66 and a loop 67 which is fastened to said axle at 68, 69; said axle and loop being fastened to the frame by loop-bolts 70. On the ends of the axle are two supporting wheels 71 and 72 which are of such diameter relative to the length of the legs 11 that when the apparatus is standing upon its legs, as shown in solid lines in Figs. 1 and 2, the wheels are free from the ground. Said axle and loop are fastened to the outer side of one of the bents of the frame, so that when the frame is tilted toward the side on which the axle is mounted the wheels 71 and 72 will reach the ground and support the frame from the ground, thus allowing the frame with the reel thereon to be trundled as a barrow.

The knob 25 is perforated to receive the end of the threading-wire 21, and is also provided with a threaded seat for a screw 73 which enters a recess 74 in the end of the threading-wire 21, so that the knob 25 is detachably fixed on the end of the wire 21 and affords a purchase for the fastening-wire, not shown, that may be wrapped around the threading-wire 21 to draw the cable or other device through the conduit 23. Each slotted spoke is preferably formed of two portions,—the body *a* and the bracket *b*; the bracket being provided with a slot 3 and being secured to the spoke-body *a* by cap-screws 75, 76. In one of the bracket-pieces is provided a perforation 77 to receive the inner end of the coil, and a set-screw is screwed through a threaded hole 78 in the bracket *b* to jam against the side of the wire 21 to hold the same tightly and prevent the coil from slipping around the reel. The walls of the slot 3 hold the threading-wire in a flat coil so that there is no danger of the coil becoming tangled. The slanting perforation 32 in the shoe forms the upper portion of a guide, the lower portion 22 of which guide is the flexible hose.

In practical operation the device may be brought into the position shown in dotted lines in Fig. 1, and by means of the loop-like handle 67, trundled to the man-hole 79, and there the frame will be turned by the handle 67 to bring the legs 11, 12, 13, 14 onto the ground and the ground-wheels 71, 72, free from the ground. Then the guide-hose 22 at the end thereof will be inserted into the man-hole, the threading-wire 21 being at the inserted end of the hose. Then the crank of the screw 55 will be turned to force the engaging faces 51, 52 against the inside walls of the conduit, thus to secure the hose. Then the workman will turn the power-cranks 56, 57, in the direction indicated by the long arrow above the reel in Fig. 2, thereby forcing the threading-wire 21 through the guide and into the conduit. As each spoke approaches the perforation 32 in the shoe 31, the pin 39 comes between the cam-faces 41 and 42, and as the spoke advances to the slanting perforation 32 the pin 39 is forced by the cam-face 41 out of the way of the wire, so that the outer limb of the wire held by the shoe is allowed to escape from that spoke, and as the spoke advances beyond the shoe the spring 40 returns the pin across the end of the slot where it remains ready to be engaged by the cam-face 41 when it is again reached. For positive action the cam-face 42 is arranged to force the pin into its closed position, although the spring will normally do this work.

I claim:—

1. A conduit-threading machine comprising a frame, a reel thereon, a wire coiled on the reel, the inner end thereof being fastened to the reel, and means to releasably hold the wire from uncoiling.

2. A conduit-threading machine comprising a frame, a reel thereon, a wire coiled on the reel, the inner end thereof being fastened to the reel, means to releasably hold the wire from uncoiling, and automatic means for releasing the wire as the reel is rotated.

3. The combination of a frame, a reel thereon provided with means to hold a coil of wire, a wire coiled on the reel in a plane at right angles to the axis of the reel, means arranged at intervals around the reel to hold the wire from uncoiling, and means to release the outer limb of the wire to allow the same to be fed from the reel as the reel is rotated.

4. The combination of a frame, a reel mounted on the frame and having slotted spokes the slots of which extend in a common plane at right angles to the axis of the reel, a wire coiled in said reel the inner end of the wire being fastened to the reel, and means at the ends of the spokes to releasably hold the wire on the reel.

5. The combination of a frame provided with a guide, a reel mounted on the frame and having slotted spokes the slots of which extend in a common plane at right angles to the axis of the reel, a wire coiled in the slots, the inner end of the wire being fastened to the reel and the diameter of the wire being approximately equal to the width of the slot, means on the spokes to hold the wire in the slots, a guide to feed the wire from the reel, and means at the guide to move the wire-holding means of the spokes as the spokes pass the guide, to allow the wire to be fed from the reel into the guide.

6. The combination of a frame, a reel mounted on the frame and having slotted spokes the slots of which extend in a common plane at right angles to the axis of the reel, a wire coiled in the slots and secured against slipping around the reel, pins on the spokes to hold the wire in the slots, means to normally hold the pins in wire-holding position, a guide on the frame, and means at the guide to withdraw the pins from wire-holding position as their respective spokes pass the guide, thus to allow the wire to be fed through the guide.

7. A conduit-threading device comprising a frame, an axle mounted on the frame, wheels on the axle, said frame being provided with legs of greater length than the radii of the wheels so that the frame may be stood upon its legs with the wheels free from the ground and may also be carried by the wheels with the legs free from the ground, a reel mounted on the frame, the axis of the reel being at right angles to the axle of the wheels, a coil of wire on the reel, means to hold the coil flat, means at intervals around the reel to hold the wire from uncoiling, and means on the frame under the reel to release the wire-holding means to allow the wire to be fed downward from the reel as the reel is rotated.

8. A conduit-threading device comprising a frame, an axle screwed to the frame, wheels on the axle, said frame being provided with legs extending beyond the rims of the wheels to support the frame when the wheels are free from the ground, a reel mounted on the frame at one side of the axle, the axis of the reel being at right angles to the axle, a guide on the frame, a coil of wire on the reel, means to hold the coil flat, means to prevent the wire from uncoiling, and means on the frame below the reel when the frame is standing upon its legs to release the wire at the guide.

9. A conduit-threading device comprising a frame, a reel mounted on the frame, a wire coiled on the reel, means to prevent the coil from slipping around the reel, means to hold the coil flat in a plane at right angles to the axis of the reel, and means on the frame to rotate the reel.

10. The combination with a reel having slotted spokes, of a flat coil of wire in the slots, means to hold the coil from slipping around the reel, pins at the ends of the slots and springs to hold the pins normally across the slots.

11. The combination with a reel having slotted spokes, of a flat coil of wire in the slots, means to hold the coil from slipping around the reel, pins at the ends of the slots, springs to hold the pins normally across the slots and means to move the pins successively from the slots as the reel rotates.

12. The combination with a frame of a reel having slotted spokes, a flat coil of wire in the slots at right angles to the axis of the reel, spring to hold the pins across the slots, a frame on which the reel is mounted to rotate, a guide through which the outer end of the wire extends and means at the guide to move the pins from the slots as the pins pass the guide.

13. The combination of a frame, means to support the frame, a reel mounted on the frame, gearing mounted on the frame on opposite sides of the reel, cranks to operate the gearing, the reel being connected with and rotatable by the gearing, a flat coil of wire fastened on the reel, means to prevent the wire from uncoiling and means under the reel to release the wire and to direct it from the reel as the reel is rotated.

14. A conduit threading device comprising a reel, a coil of wire fastened to the reel, means to hold the coil flat, means to hold the wire from uncoiling, means to feed the coil from the reel, a guide to conduct the wire to the conduit and means to fasten said guide to the conduit.

15. The combination of a frame, a reel mounted thereon and provided with slotted spokes, the slots thereof extending in a common plane at right angles to the axis of the reel, the spokes being provided with projections at the ends of the slots; pins in said projections to close the slots, springs to hold the pins in slot-closing position, a wire coiled in the slots, a stationary guide to receive the wire, and cam faces adjacent the guide to engage the ends of the pin to remove the pins in succession from across their slots respectively as the spoke passes the guide.

16. The combination of a frame; a reel mounted thereon and provided with slotted spokes, the slots thereof extending in a common plane at right angles to the axis of the reel, and said spokes being provided with projections at the ends of the slots; pins in said projections to close the slots, springs to hold the pins in slot-closing position, a wire coiled in the slots, a shoe forming a stationary guide to receive the wire, cam faces adjacent the guide to engage the ends of the pin to remove the pins in succession from across their slots respectively as the spokes pass the guide, said shoe being provided adjacent the guide with a way, and a tire connecting the spokes and movable in said way.

17. A conduit threading device comprising a reel having a narrow slot, a wire approximately fitting the slot and coiled therein in a flat coil, means to hold the coil from uncoiling, a guide to direct the wire into a conduit, and means for rotating the coil to force the wire through the guide into the conduit.

In testimony whereof, I have hereunto set my hand at Los Angeles, California, this 10th day of April, 1909.

FRANK CRAWFORD.

In presence of—
  JAMES R. TOWNSEND,
  L. BELLE RICE.